(12) United States Patent
Lam

(10) Patent No.: US 12,714,259 B2
(45) Date of Patent: Aug. 25, 2026

(54) AIR FRYER WITH SMOKING AGENT HOLDER

(71) Applicant: U Fung Lam, Kowloon Tong (HK)

(72) Inventor: U Fung Lam, Kowloon Tong (HK)

( * ) Notice: Subject to any disclaimer, the term of this patent is extended or adjusted under 35 U.S.C. 154(b) by 335 days.

(21) Appl. No.: 18/469,667

(22) Filed: Sep. 19, 2023

(65) Prior Publication Data

US 2024/0090700 A1 Mar. 21, 2024

(30) Foreign Application Priority Data

Sep. 19, 2022 (HK) .......................... 32022060585.3

(51) Int. Cl.
*A47J 37/06* (2006.01)

(52) U.S. Cl.
CPC ....... *A47J 37/0641* (2013.01); *A47J 37/0664* (2013.01)

(58) Field of Classification Search
CPC .......................... A47J 37/0641; A47J 37/0664
USPC ........................................................ 126/21 A
See application file for complete search history.

(56) References Cited

FOREIGN PATENT DOCUMENTS

| | | | | |
|---|---|---|---|---|
| EP | 3351856 A1 * | 7/2018 | ............. | A23L 27/27 |
| WO | WO-2021068438 A1 * | 4/2021 | .............. | A47J 37/06 |

* cited by examiner

*Primary Examiner* — Allen R. B. Schult
*Assistant Examiner* — William C Weinert
(74) *Attorney, Agent, or Firm* — Renner, Kenner, Greive, Bobak, Taylor & Weber

(57) ABSTRACT

An air fryer includes a motor-driven fan forcing air received from an axial inlet out from a radially out into an internal transfer passage that leads into the cooking chamber. A removable smoking agent holder is disposed in the transfer passage.

14 Claims, 3 Drawing Sheets

AIR FRYER WITH SMOKING AGENT HOLDER

TECHNICAL FIELD

The present invention relates to ovens of the air fryer type that use a high velocity current of hot air to rapidly cook food and which include a holder for a smoking agent, such as wood pieces, that are burned to make smoke for flavouring food.

BACKGROUND OF THE INVENTION

Air fryers are forced convection ovens in which hot air is impelled by a fan around and through food at a relatively high speed, allowing it to be cooked using much less oil than is needed for deep frying, or even using no oil at all. The Chinese utility model patent CN212546658U describes an air fryer that includes a perforated smoke box for receiving finely divided wood. A fan with radial blades is encircled by a heating element and disposed next to the back of the appliance, opposite the opening of the cooking chamber. The smoke box is disposed radially outside the heating element at the top rear of the air fryer such that a radial air flow is induced both past the heating element and the smoke box. A removable closure on the smoke box prevents the escape of smoke and provides internal access for filling it. This prior art air fryer suffers from a number of drawbacks in that the smoke box is inconvenient to access and to clean and the air flow is such that it risks the unwanted entrainment of ash. It is an object of the present invention to overcome or substantially ameliorate the above drawbacks or, more generally, to provide an improved air fryer.

DISCLOSURE OF THE INVENTION

According to one aspect of the present invention there is provided an air fryer, comprising:

- a housing enclosing a cooking chamber and having a cooking chamber opening through which food to be cooked is inserted;
- a heating element for heating the cooking chamber;
- a closure for closing the cooking chamber opening;
- a motor and a circulation fan;
- a transmission connected to the motor for supplying torque to the circulation fan;
- wherein the circulation fan is mounted to turn about an axis and is disposed in a transfer passage separated from the cooking chamber by a bounding wall, where at least part of the bounding wall extends at one axial side of the circulation fan, the transfer passage having an inlet at an opposing axial side of the circulation fan opposite the one axial side and extending via an outlet into the cooking chamber;
- a transfer passage aperture in the housing that leads into the transfer passage;
- a cover for closing the transfer passage aperture, and
- a smoking agent holder that is open for dispensing smoke and insertable through the transfer passage aperture into a receiving portion of the transfer passage.

The smoking agent holder is thus readily removeable for filling or cleaning. Preferably the smoking agent holder comprises an open top and a base and upstanding peripheral wall that are imperforate and thus suitable for retaining finely divided smoking agents like wood shavings, sawdust and ground spices. Alternatively, the smoking agent holder may have a perforate base for supporting smoking agents in larger form (e.g. wood pellets) and promoting air throughflow, while retaining them, along with ash.

The transmission preferably comprises a motor shaft for direct drive of the circulation fan. Alternatively, the transmission may comprise a gear train, as for speed reduction.

Preferably the smoking agent holder comprises a tray and the cover is fixed to and/or integral with the tray, such that sliding the tray into the transfer passage aperture closes the transfer passage aperture.

Preferably the housing has a first side in which the cooking chamber opening is disposed adjacent to the transfer passage aperture.

Preferably the tray is divided into compartments by upstanding ribs. Preferably the tray comprises platforms alongside the compartments and elevated above the base with an array of holes in each platform through which air passes.

Preferably a neck portion of the transfer passage extends substantially radially between an outer circumference of the circulation fan and the receiving portion, the neck portion delivering radial air flow into a head space above the tray, with the outlet into the cooking chamber located below the tray.

Preferably the head space is bounded by a diverging wall that diverges to increase the head space in a radially-outer direction to promote air circulation above the tray.

Preferably the air fryer further comprises a distribution fan fixed coaxially to the circulation fan for co-rotation therewith, the distribution fan disposed in the cooking chamber adjacent the boundary wall, wherein the bounding wall further comprises a circumferential wall part encircling the distribution fan, and wherein a first communicating opening in the circumferential wall leads into the transfer passage.

Preferably the heating element is disposed in the cooking chamber adjacent the distribution fan.

Preferably the transfer passage comprises a first leg of an airflow passage that that further comprises a second leg that extends to a vent in the housing.

Preferably the second leg extends substantially radially between an outer circumference of the circulation fan and the vent. Preferably the second leg and the neck portion are diametrically opposite.

Preferably a second communicating opening in the circumferential wall of the shroud leads into the second leg and is located diametrically opposite the first communicating opening.

Preferably the motor is disposed inside the housing adjacent an outer wall of the housing, the outer wall is substantially planar and the axis is substantially perpendicular to the outer wall.

BRIEF DESCRIPTION OF THE DRAWINGS

Preferred forms of the present invention will now be described by way of example with reference to the accompanying drawings, wherein.

DESCRIPTION OF THE PREFERRED EMBODIMENTS

Figures 1, 2:
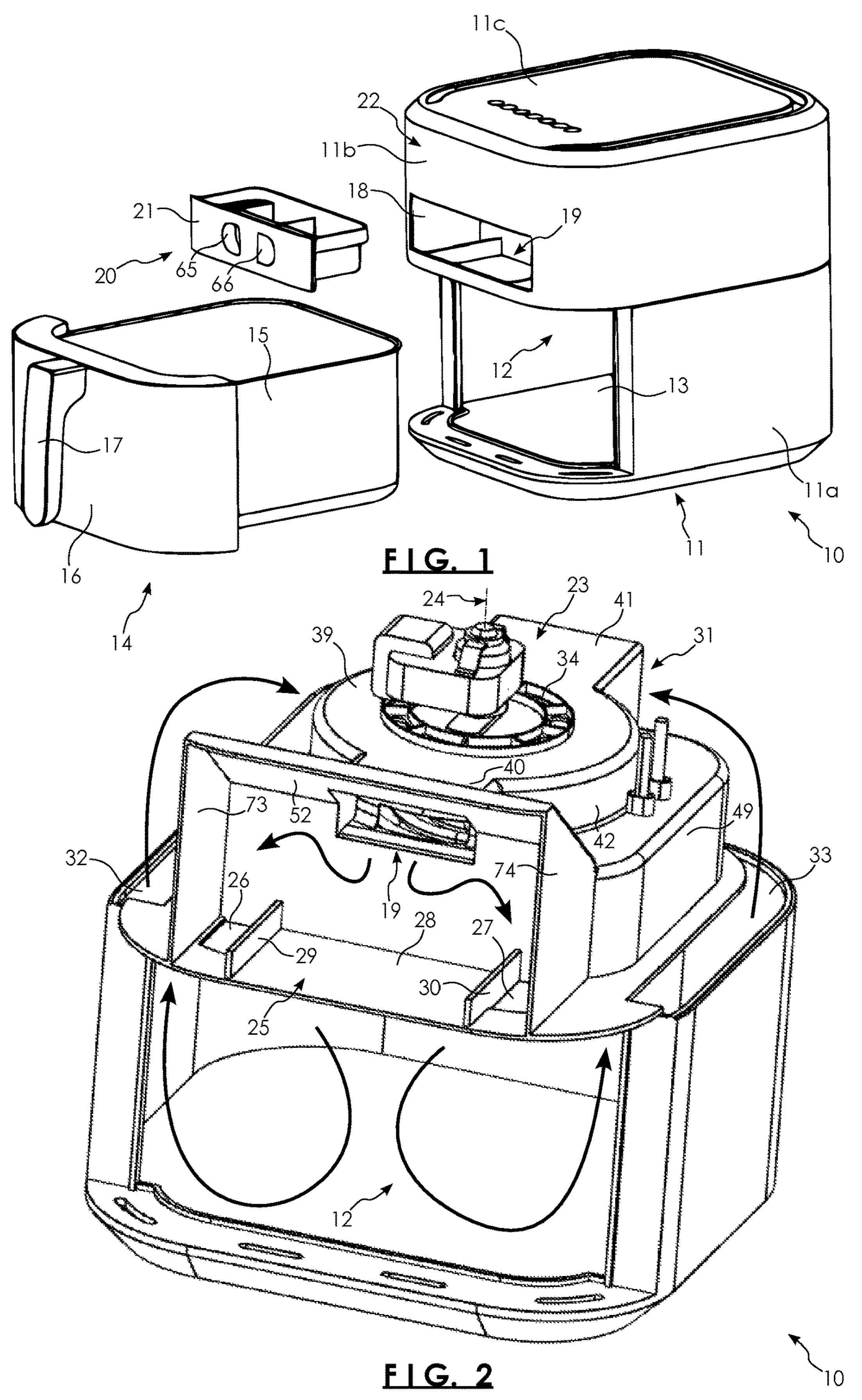
FIG. 1 is a perspective view of an air fryer according to an embodiment of the invention, showing the food drawer and smoking agent holder withdrawn from respective adjacent openings in the housing.
FIG. 2 is a perspective view of the air fryer of FIG. 1 in which an upper components of the housing assembly have been removed.

Referring to FIG. 1, the air fryer 10 may be an electric appliance of the benchtop type comprising a housing 11 of an approximately rectangular prismatic form. The housing 11 is an assembly that may include a base shell 11*a* and an upper shell 11*b* closed at its top by a panel 11*c*. A cooking chamber 12 enclosed by the housing 11 has a cooking chamber opening 13 through which food to be cooked may be inserted when received in a drawer 14. The drawer 14 may include an open-topped dish part 15 fixed to a closure 16 having a handle 17 such that the closure 16 closes the cooking chamber opening 13. A transfer passage aperture 18 in the housing 11 leads into a transfer passage 19 (described in detail below) that may receive a smoking agent tray 20. The tray 20 is also a drawer-like container and may include an integral cover 21 for closing the transfer passage aperture. Disposing the transfer passage aperture 18 near the cooking chamber opening 13 makes access to the tray 20 easily available to the user. The transfer passage aperture 18 may be disposed adjacent to and above the cooking chamber opening 13 in a front side 22 of the housing 11, with the drawer 14 and smoking agent tray 20 arranged to slide parallel to one another.

In FIG. 2 the upper shell 11*b* and panel 11*c* have been removed and the unlabelled arrows indicate the approximate general direction of air flow circulation. A fan/motor assembly 23, defining an upright fan axis 24, may be disposed in the top of the housing with the cooking chamber 12 in the base. As used herein, the term "axial" refers to a direction substantially parallel to the fan axis 24. The term "radial" refers to a direction substantially orthogonal to the fan axis 24. The term "circumferential" refers to the direction of a circular arc having a radius substantially orthogonal to the fan axis 24.

The fan/motor assembly 23 comprises a fan casing 31. The transfer passage 19 may lead radially from the fan/motor assembly 23 into the top of a receiving portion 25 of the transfer passage 19 that receives the smoking agent tray 20. Outlets 26, 27 in the receiving portion 25 may be holes disposed at opposing ends of a lower wall 28, and they thus provide an air path into the cooking chamber 12. Parallel rails 29, 30 may be provided upstanding from the lower wall 28 adjacent respective ones of the outlets 26, 27 for supporting the tray 20 such its ends overhang the rails 29, 30. Air flow thus enters the cooking chamber 12, circulates and exits generally in the opposing direction through apertures 32, 33 at the top of the cooking chamber 12 that may be elongated to extend along opposing sides. Air is then drawn in through the inlet 34 at an outer axial end of the fan/motor assembly 23.

Figures 3, 4:
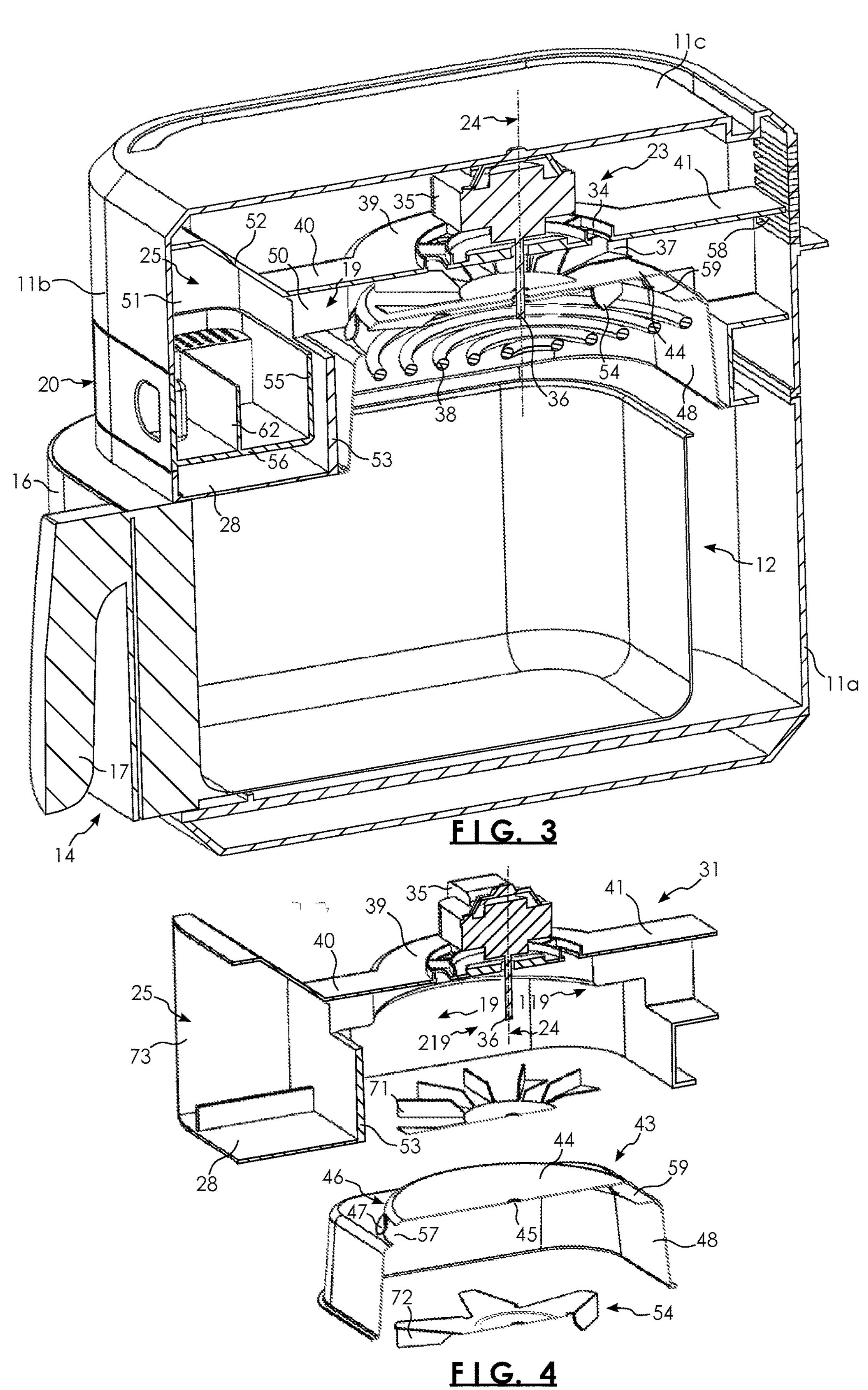
FIG. 3 is a schematic section in an upright plane through the assembled air fryer of FIG. 1.
FIG. 4 is an exploded view of the elements of a fan assembly of FIG. 3 sectioned in an upright plane.
Figure 5:
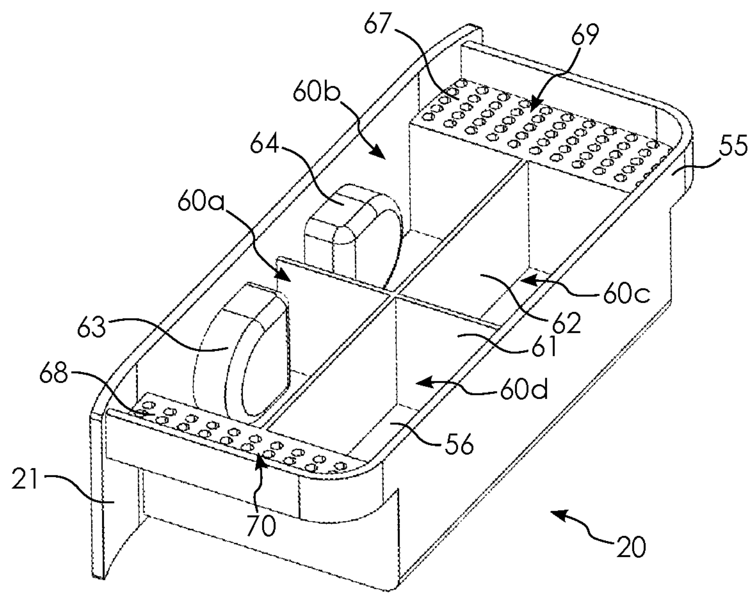
FIG. 5 is a perspective view from above of a smoking agent holder of the air fryer of FIG. 1.

Referring to FIGS. 3 and 4, an electric heating element 38 may be provided near the top of the cooking chamber 12, and may be of the spiral type disposed generally in a radial-circumferential, or horizontal, plane.

The fan/motor assembly 23 may comprise a motor 35 having a shaft 36 fixed to a circulation fan 37. The circulation fan 37 may have radial blades 71 and is mounted to turn about axis 24 and disposed in the transfer passage 19. The fan casing 31 may comprise an annular portion 39 from which projects a cylindrical portion 42 encircling the circulation fan 37 and diametrically opposing duct portions 40, 41 projecting outward.

A shroud 43 may comprise a bounding wall 46 with a flat annular part 44 coaxial with axis 24. The shaft 36 extends through through-hole 45 in the centre of the annular part 44. The bounding wall 46 further comprises a circumferential part 47 extending generally axially from the peripheral walleter of the annular part 44. The shroud 43 may further comprise a generally rectangular dish-shaped part 48 extending from the lower peripheral walleter of the circumferential part 47 and which is complementary to a rectangular dish-shaped section 49 of the fan casing 31. The circulation fan 37 is disposed between the fan casing 31 and bounding wall 46 which define part of the transfer passage 19, with the circulation fan 37 separated from the cooking chamber 12 by bounding wall 46, the annular part 44 of which is located axially inside the circulation fan 37. The inlet 34 in the fan casing 31 is at an opposing axially outer side of the circulation fan 37.

The duct portion 40 encloses a neck portion 50 of the transfer passage 19 that extends substantially radially between an outer circumference of the circulation fan 37 and the receiving portion 25, the neck portion 50 delivering radial air flow into a head space 51 in the receiving portion 25 above the tray 20. The head space 51 may be bounded above by a diverging wall 52 that diverges to increase the head space 51 in a radially-outer direction to promote air circulation above the tray 20. Transverse wall 53 transverse to the transfer passage 19, and lower walls 28 bounding the receiving portion 25, may be part of that fan casing 31, along with opposing parallel side walls 73, 74. Transverse wall 53 and lower wall 28 are spaced apart from adjacent peripheral wall and bottom walls 55, 56 of the tray 20 for providing air circulation space. The integral cover 21 of the tray 20 is received in, and thereby closes, the transfer passage aperture 18 and when thus closed its outer face may be flush with an adjacent surface of the front side 22. The drawer 14 (shown partly open) may be flush when closed in a corresponding manner.

A distribution fan 54 disposed in the cooking chamber 12 may have radial blades 72 and be fixed coaxially to the circulation fan 37 for co-rotation therewith. The distribution fan 54 may be located axially adjacent the boundary wall 46 and encircled by the circumferential part 47. A first communicating opening 57 in of the circumferential part 47 leads into the neck 50 of the transfer passage 19.

The transfer passage 19 may be the first leg of an airflow passage 219 that further comprises a second leg 119. The transfer passage 19 and second leg 119 may extend in opposite directions from the axis 24, with the second leg 119 being enclosed by the duct 41. The second leg 119 may extend substantially radially between an outer circumference of the circulation fan 37 to a vent 58 in the upper shell 11*b* that is normally-closed and can be opened to allow air to be vented from the housing 11 to the atmosphere. A second communicating opening 59 in the circumferential part 47 of the shroud 43 leads into the second leg 119 and is located diametrically opposite the first communicating opening 57.

As best seen in FIG. 6, the smoking agent tray 20 may be formed of metal and is readily removable for filling or cleaning and comprises a bottom wall 56 and upstanding peripheral wall 55 that are imperforate and thus suitable for retaining finely divided smoking agents like wood shavings, sawdust and ground spices. Such a tray 20 can also be used for alternative cooking processes, like melting butter or cooking sauces etc., providing dual-use benefits. The tray 20 may be subdivided into compartments 60*a*, 60*b*, 60*c*, 60*d* by upstanding ribs 61, 62. The cover 21 may be integral, forming part of the peripheral wall around the compartments 60*a* and 60*b*. Two hollow convex protrusions 63, 64 project onto the tray 20 from the cover 21, each defining on the opposite side an outwardly-opening pocket 65, 66 (see FIG. 1) into which a user's fingers can be inserted to grasp the tray and open it. The tray 20 may comprise platforms 67, 68 elevated above the base 56, but below a rim of the peripheral wall 55, with an array of holes 69, 70 in each platform 67, 68. Each of the arrays of holes 69, 70 may be disposed in registration with a respective one of the outlets 26, 27 such that air flow tends to pass through the holes passes directly to the outlets 26, 27 for quickly heating the tray 20. The tray 20 is open at its top toward the head space 51, where circulating air flow promoted by the diverging wall 52 helps ensure that smoke is reliably entrained and mixed, and mitigates ash entrainment.

The distribution fan 54 forces air flow about the heating element 38 and contributes to a turbulent high speed air flow in the cooking chamber 12, while also pushing air out of the cooking chamber 12 through the first communicating opening 57 into the transfer passage 19 or, when the vent 58 is open, through the second communicating opening 59 into the second leg 119.

Aspects of the present invention have been described by way of example only and it should be appreciated that modifications and additions may be made thereto without departing from the scope thereof.

The invention claimed is:

1. An air fryer, comprising:

a housing enclosing a cooking chamber and having a cooking chamber opening through which food to be cooked is inserted;

a heating element for heating the cooking chamber;

a closure for closing the cooking chamber opening;

a motor and a circulation fan;

a transmission connected to the motor for supplying torque to the circulation fan;

wherein the circulation fan is mounted to turn about an axis and is disposed in a transfer passage separated from the cooking chamber by a bounding wall, where at least part of the bounding wall extends at one axial side of the circulation fan, the transfer passage having an inlet at an opposing axial side of the circulation fan opposite the one axial side and extending via an outlet into the cooking chamber;

a transfer passage aperture in the housing that leads into the transfer passage;

a cover for closing the transfer passage aperture, and a smoking agent holder that is open for dispensing smoke and insertable through the transfer passage aperture into a receiving portion of the transfer passage, wherein the smoking agent holder comprises a tray and the cover is fixed to and/or integral with the tray, such that sliding the tray into the transfer passage aperture closes the transfer passage aperture.

2. The air fryer of claim 1 wherein the smoking agent holder comprises an open top, and a base and upstanding peripheral wall that are imperforate.

3. The air fryer of claim 2 wherein the tray is divided into compartments by upstanding ribs.

4. The air fryer of claim 1 wherein the housing has a first side in which the cooking chamber opening is disposed adjacent to the transfer passage aperture.

5. The air fryer of claim 3 wherein the tray comprises platforms alongside the compartments and elevated above the base with an array of holes in each platform through which air passes.

6. The air fryer of claim 1 wherein a neck portion of the transfer passage extends substantially radially between an outer circumference of the circulation fan and the receiving portion, the neck portion delivering radial air flow into a head space above the tray, with the outlet into the cooking chamber located below the tray.

7. The air fryer of claim 6 wherein the head space is bounded by a diverging wall that diverges to increase the head space in a radially-outer direction to promote air circulation above the tray.

8. The air fryer of claim 1 wherein the air fryer further comprises a distribution fan fixed coaxially to the circulation fan for co-rotation therewith, the distribution fan disposed in the cooking chamber adjacent the bounding wall, wherein the bounding wall further comprises a circumferential wall partially encircling the distribution fan, and wherein a first communicating opening in the circumferential wall leads into the transfer passage.

9. The air fryer of claim 8 wherein the heating element is disposed in the cooking chamber adjacent the distribution fan.

10. The air fryer of claim 8 wherein the transfer passage comprises a first leg of an airflow passage that that further comprises a second leg that extends to a vent in the housing.

11. The air fryer of claim 10 wherein the second leg extends substantially radially between an outer circumference of the circulation fan and the vent.

12. The air fryer of claim 11 wherein the second leg and the neck portion are diametrically opposite.

13. The air fryer of claim 10 wherein a second communicating opening in the circumferential wall of the bounding wall leads into the second leg and is located diametrically opposite the first communicating opening.

14. The air fryer of claim 1 wherein the motor is disposed inside the housing adjacent an outer wall of the housing, the outer wall is substantially planar and the axis is substantially perpendicular to the outer wall.

* * * * *